United States Patent Office 3,393,968
Patented July 23, 1968

3,393,968
CELLULOSE REACTED WITH ETHYLENEIMINE IN THE PRESENCE OF GLACIAL ACETIC ACID
Leon Segal, Metairie, La., assignor to the United States of America as represented by the Secretary of Agriculture
No Drawing. Filed June 8, 1964, Ser. No. 373,588
6 Claims. (Cl. 8—116.2)

ABSTRACT OF THE DISCLOSURE

Fibrous cellulosic fabrics are reacted with ehtyleneimine in the presence of glacial acetic acid, the ratios of acetic acid to imine being about from 1:1 to 1:20, and using benzene and the like as solvents. Receptiveness to acid wool dyes, moderate ion-exchange capacity, and complex-forming capability with metal ions is imparted to the textiles by means of modification of the cellulose to the extent of about as high as 6.2% nitrogen.

A non-exclusive, irrevocable, royalty-free license in the invention herein described, throughout the world for all purposes of the United States Government, with the power to grant sublicenses for such purposes, its hereby granted to the Government of the United States of America.

This invention relates to the treatment of cellulosic materials with ehtylenimine (EI). More particularly, this invention relates to the chemical modification of cotton and other cellulosics by ethylenimine to produce novel textiles with enhanced utility. The process of this invention brings to the textile industry a way of imparting to cellulosics improved dyeing characteristics. Furthermore, these derivatives serve as intermediates for the preparation of metal complexes.

The primary object of this invention is to provide a process for reacting cellulosic materials and ethylenimine by means of a catalyst.

A second object of this invention is to provide a process which improved existing methods of preparation of the ethylenimine cellulose derivative by lowering reaction temperature thereby yielding a process more acceptable commercially.

Another object of this invention is to provide a process for the preparation of ethylenimine chemically modified derivatives of cotton and rayon, having new and desirable properties.

A further object of this invention is the production of metal complexes of the intermediate cellulosics wherein the said metal complexes are products with bacteriostatic and bactericidal properties.

This invention teaches that the introduction of a carboxylic acid, and in particular glacial acetic acid, into the mixture of imine and solvent and cellulose causes the reaction of the imine with the cellulose, which is unique and contrary to expectations based on the works of earlier investigators. In pursuing this work certain molar ratios of the said glacial acetic acid to EI are found to be more rewarding than others, as well as certain concentrations of the EI in benzene.

The derived cellulosics retain a significant nitrogen concentration even after extraction with water in a Soxhlet apparatus, and after exposure to a boiling 2% aqueous sodium hydroxide solution. These derived cellulosics were found to be insoluble in 0.5 M cupriethylenediamine, and the infrared absorption spectrum is strikingly similar to that of authentic aminoethylcellulose prepared with aminoethylsulfuric acid. The derived cellulosic fabrics dye strongly with wool dyes. Calco Stain No. 2 dyes these black, which is the color normally obtained with silk.

The reaction products possess a high ion-exchange capacity, and form stable, colored complexes with various metal ions. The brown cobalt complex is unaffected by 3 N ammonium hydroxide, and only changes color, to pink, in 3 N hydrochloric acid. The blue copper complex is unaffected by the 3 N ammonium hydroxide, but is decomposed by the acid. The colorless material, however, after washing out the acid and being placed again in the copper solution, regains its blue color. Other colored complexes are formed with nickel salts, potassium dichromate, and sodium chromate.

It is expected that improved rot and weather resistance characteristics can be imparted to cotton through the metal complexes. Antiseptic and antibacterial cotton materials can be realized which are suitable for wound dressings, surgical packings, medical personnel garments, hospital bed sheets and towels, and other such materials.

The laboratory procedure for treating cellulosic material with EI consists of adding a weight amount of EI to benzene in a distilling flask, stirring the mixture in the flask, then placing the cellulosic material into the solution in the flask. A weighed molar quantity of glacial acetic acid is added dropwise with constant stirring, and the reagents and cellulose are refluxed for about 4 hours. At the end of the desired reflux time the cellulosic material is removed and washed.

For example, in a preferred treatment of a 20/1 cotton yarn with an acid-to-imine molar ratio of about 1:10 the operation is carried out in the following manner:

To a 10% EI in benzene solution—that is, 7.4 grams (0.172 mole) EI in 75 ml. (0.844 mole) benzene are added 4.7 grams of air-dry cotton yarn (0.03 mole cellulose). Then, dropwise and with swirling, 1.05 grams (0.017 mole) of acetic acid are added to the flask. The contents are refluxed for a selected period of time, and the reacted yarn is removed, and washed with fresh benzene, acetone, ethanol, and finally with water.

The examples below are set forth to illustrate and not to limit the scope of this invention. The data presents the effects of (1) variation of the acid-to-imine ratio, (2) variation of the cellulosic material-to-reagent bath ratio, (3) variation of the solvent, and (4) variation in the mode of washing the final product. The nitrogen content of the cellulosic derivatives was determined by the Kjeldahl method. Kiton Pure Blue V (Color Index No. 42045), buffered to pH 3.0, and Calco Stain No. 2, both applied at the boil, were used for dye-testing the derivatives. Aqueous solutions of metal salts were applied at a concentration of about 5%, and the cupriethylenediamine test for solubility of the derivatives was carried out with a 0.5 M solution.

EXAMPLE 1

A quantity of 7.4 grams (0.172 mole) of ethylenimine (EI) was added to 75 ml. (0.844 mole) of benzene in a distilling flask. This constitutes a 10% EI solution. After stirring the solution 4.7 grams (0.03 mole) of cellulose (cotton yarn) was introduced. The yarn was allowed to submerge and wet thoroughly in the solution in the flask, then 1.05 grams (0.017 mole) of glacial acetic acid was added dropwise with continuous swirling. The flask was equipped with water-cooled condenser and the contents were made to reflux for 4 hours. The reaction was stopped, the yarn removed, and the excess solution drained off. The yarn was rinsed with fresh benzene; then solvent-exchanged to acetone, ethanol, and finally water. The treated yarn had a weight gain of 15.7% after it had been allowed to air-dry, and a nitrogen content of 3.0%. The dry, final product was a very kinky yarn.

EXAMPLE 2

The method and reagents of Example 1 were repeated with rayon yarn. The weight gain of the cellulosic derivative, as compared to the untreated yarn, was 34.6%. The nitrogen content was 6.2%.

EXAMPLE 3

The method and reagents of Example 1 were repeated using kier-boiled cotton yarn, and omitting the glacial acetic acid. The weight gain of the cellulosic derivative, as compared to the untreated yarn, was 0.12%. The nitrogen content was 0.9%.

EXAMPLE 4

The method and reagents of Example 3 were repeated using rayon yarn, omitting the acetic acid but substituting toluene (B.P. 110.6° C.) for benzene (B.P. 80.1° C.) thereby gaining a higher reaction temperature. The treated yarn had a weight gain of 5% after it had been allowed to air-dry, and a nitrogen content of 1.5%.

EXAMPLE 5

The method and reagents of Example 1 were repeated using cotton yarn, but the ratio of acetic acid-to-EI was varied from 1:10 to 1:15. This had only a slight effect on the amount of nitrogen bound in the cellulose. Other variations in ratio were tried, and the results are recorded on Table I.

TABLE I

| Acid-to-EI Ratio | Nitrogen, percent | Weight Gain, percent |
|---|---|---|
| 1:1 | 0.9 |  |
| 1:2 | 0.5 |  |
| 1:5 | 1.7 | 8.0 |
| 1:10 | 3.0 | 15.7 |
| 1:15 | 2.95 | 16.6 |
| 1:20 | 2.91 | 16.0 |

EXAMPLE 6

The method and reagents of Example 1 were repeated using kier-boiled cotton, mercerized cotton, and viscose rayon; however, water was used as the diluent, instead of benzene. The following data were obtained from this investigation:

| Yarn Sample | Nitrogen Content, percent | Weight Gain, percent |
|---|---|---|
| Kier-boiled cotton | 0.27 | 1.32 |
| Mercerized cotton | 0.16 | 2.17 |
| Viscose rayon | 1.47 | 5.31 |

EXAMPLE 7

The method and reagents of Example 1 were repeated using kier-boiled cotton; however the bath composition was changed to 3.7 grams (0.086 mole) EI, 80 ml. (0.96 mole) benzene, and 0.52 gram (0.0086 mole) glacial acetic acid. This constitutes a 5% EI solution. This solution applied to a 4.8 gram sample of the said kier-boiled cotton gave a product with a 7.3% weight gain after it had been allowed to air-dry, and a nitrogen content of 2.1%.

EXAMPLE 8

The method and reagents of Example 7 were repeated with but one variation. The solution was prepared to a 20% concentration. More specifically, the quantities used were 14.8 grams (0.344 mole) EI, 65 ml. (0.731 mole) benzene, and 2.05 grams (0.034 mole) glacial acetic acid. This reaction yielded a yarn product with a weight gain of 29.3% after it has been allowed to air-dry, and a nitrogen content of 4.7%.

When a doubled volume of 10% EI solution was applied, to present the same quantity of EI as in a volume of 20% solution, using again 4.8 grams of the cotton yarn, essentially the same results were obtained.

EXAMPLE 9

The method and reagents of Example 8, using a 20% solution, were repeated with but one exception, the yarn used was a mercerized cotton yarn. When the finished product was rinsed in benzene—the same solvent employed in the reaction—the yarn product was very gummy, had a weight gain of 195% and a nitrogent content of 12.8%. An acetone wash reduced this to 81% weight gain and a nitrogen content of 8.6%. This yarn was further washed with ethanol, and the weight gain was reduced to 62% while the nitrogen was reduced to 7.8%. A final water wash yielded a product with a weight gain of 13% and a nitrogen content of 2.85%. The air-dry yarn after washing was white in all instances, that is, there was no trace whatever of yellow color.

Experiments attempting total elimination of the attached radical from the cellulose indicated that the imine is strongly bound chemically. Samples of a reacted mercerized cotton yarn, acetone- and alcohol-washed, never-dried, as well as a treated sample air-dried from benzene, were found to contain 1.3% nitrogen when extracted with water in a Soxhlet apparatus and air-dried. A treated mercerized cotton yarn was boiled 2 hours in 2% aqueous sodium hydroxide. The washed and dried product had a 1.5% nitrogen content.

X-ray diffraction studies of the EI-treated cotton showed no change in the crystal structure when compared to the initial material.

I claim:

1. A process for imparting to a cellulosic textile receptivity to acid wool dyes, ion-exchange capacity, and complex-forming ability with metal ions by means of a chemical modification of the cellulose to the extent of providing a nitrogen content of not exceeding about 6.2% in the finished, washed, and extracted product, comprising:

(a) immersing a cellulosic textile selected from the group consisting of cotton, mercerized cotton, and regenerated cellulose in a solution containing about from 5% to 20% by weight of ethyleneimine in an inert, organic solvent selected from the group consisting of benzene and toluene, said solution also containing glacial acetic acid, in an acid-to-imine ratio of 1:1 to 1:.20, as a catalyst for the reaction between the cellulosic textile and the ethyleneimine, and (b) reacting the cellulosic textile with the ethyleneimine in the said catalyzed solution at a corresponding reflux temperature for a period of time of about 4 hours.

2. The process of claim 1 wherein the cellulosic textile is cotton.

3. The process of claim 1 wherein the cellulosic textile is mercerized cotton.

4. The process of claim 1 wherein the cellulosic textile is regenerated cellulose.

5. The process of claim 1 wherein the solvent is benzene and the corresponding reflux temperature is about 80.1° C.

6. The process of claim 1 wherein the solvent is toluene and the corresponding reflux temperature is about 110.6° C.

References Cited

UNITED STATES PATENTS

| 2,925,317 | 2/1960 | Moore et al. | 8—128 X |
| 2,972,606 | 2/1961 | Hartman et al. | 8—116.2 X |

OTHER REFERENCES

Segal et al., Textile Research Journal, September 1963, pp. 739–745, 8–116.2.

NORMAN G. TORCHIN, *Primary Examiner.*

J. C. CANNON, *Assistant Examiner.*